United States Patent
Jakschitsch

(10) Patent No.: US 11,789,948 B2
(45) Date of Patent: Oct. 17, 2023

(54) COMPUTATIONAL DEPENDENCY DIRECTORY

(71) Applicant: SAP SE, Walldorf (DE)

(72) Inventor: Hannes Jakschitsch, Mannheim (DE)

(73) Assignee: SAP SE, Walldorf (DE)

( * ) Notice: Subject to any disclaimer, the term of this patent is extended or adjusted under 35 U.S.C. 154(b) by 48 days.

(21) Appl. No.: 17/548,072

(22) Filed: Dec. 10, 2021

(65) Prior Publication Data

US 2023/0185804 A1  Jun. 15, 2023

(51) Int. Cl.
*G06F 16/2455* (2019.01)
*G06F 16/28* (2019.01)

(52) U.S. Cl.
CPC ........ *G06F 16/2455* (2019.01); *G06F 16/289* (2019.01)

(58) Field of Classification Search
CPC ............................ G06F 16/2455; G06F 16/289
USPC ......................................................... 707/718
See application file for complete search history.

(56) References Cited

U.S. PATENT DOCUMENTS

| | | | | |
|---|---|---|---|---|
| 5,689,698 A * | 11/1997 | Jones | ..................... | G06F 16/284 707/999.102 |
| 5,754,841 A * | 5/1998 | Carino, Jr. | ............. | G06F 16/289 |
| 5,794,250 A * | 8/1998 | Carino, Jr. | ............. | G06F 16/284 707/999.009 |
| 5,864,843 A * | 1/1999 | Carino, Jr. | ............. | G06Q 40/00 707/999.102 |
| 5,873,083 A * | 2/1999 | Jones | ..................... | G06F 16/284 |
| 5,878,427 A * | 3/1999 | Waheed | ................ | G06F 16/289 |
| 6,460,043 B1 * | 10/2002 | Tabbara | ............... | G06F 16/2423 |
| 6,651,072 B1 * | 11/2003 | Carino, Jr. | ............. | G06F 16/48 707/999.009 |
| 6,728,694 B1 * | 4/2004 | Ramasamy | ....... | G06F 16/24532 707/960 |
| 7,421,458 B1 * | 9/2008 | Taylor | ................... | G06F 16/289 707/999.203 |
| 7,801,882 B2 * | 9/2010 | Cunningham | ........ | G06F 16/221 707/713 |
| 7,984,042 B2 * | 7/2011 | Colrain | ............. | G06F 16/24552 707/718 |
| 8,402,473 B1 * | 3/2013 | Becker | ................ | G06Q 10/067 719/313 |
| 8,775,413 B2 * | 7/2014 | Brown | ............. | G06F 16/24549 707/718 |

(Continued)

*Primary Examiner* — Hanh B Thai
(74) *Attorney, Agent, or Firm* — Mintz Levin Cohn Ferris Glovsky and Popeo, P.C.

(57) ABSTRACT

A method, a system, and a computer program product for generating a computational dependency directory and executing a query on a database using generated computational dependency directory. A data object in a plurality of data objects is stored in a database storage location. The data object includes a dependency parameter being indicative of the stored data object being dependent on at least another data object in the plurality of data objects. A query to access the stored data object in the plurality of data objects is received. A determination is made, using the dependency parameter, whether the stored data object is responsive to the received query. A query execution plan is generated based on the determining and the received query. The query is executed using the query execution plan.

20 Claims, 7 Drawing Sheets

(56) References Cited

U.S. PATENT DOCUMENTS

| | | | |
|---|---|---|---|
| 8,843,435 B1* | 9/2014 | Trefler | G06F 16/21 707/600 |
| 8,903,770 B2* | 12/2014 | Kucera | G06Q 30/01 707/802 |
| 9,305,057 B2* | 4/2016 | de Castro Alves | G06F 16/25 |
| 9,448,944 B2* | 9/2016 | Seitz | G06F 12/0875 |
| 9,934,279 B2* | 4/2018 | Kali | G06F 16/24558 |
| 10,162,851 B2* | 12/2018 | Eidson | G06F 16/2455 |
| 10,268,742 B2* | 4/2019 | Adya | G06F 16/217 |
| 10,467,200 B1* | 11/2019 | Trefler | G06F 16/289 |
| 10,642,805 B1* | 5/2020 | Masse | G06F 16/215 |
| 10,719,537 B2* | 7/2020 | Herold | G06F 16/258 |
| 2001/0056426 A1* | 12/2001 | Obendorf | G06F 16/284 |
| 2002/0049749 A1* | 4/2002 | Helgeson | H04L 63/083 707/999.003 |
| 2004/0205053 A1* | 10/2004 | Bird | G06F 16/284 |
| 2004/0220942 A1* | 11/2004 | Agrawal | G06F 16/284 |
| 2010/0070480 A1* | 3/2010 | Ahuja | G06F 16/25 707/703 |
| 2010/0185593 A1* | 7/2010 | Wong | G06F 11/1402 707/684 |
| 2010/0235322 A1* | 9/2010 | Kuruganti | G06F 16/27 707/610 |
| 2010/0281018 A1* | 11/2010 | Denuit | G06F 16/24542 707/718 |
| 2011/0035369 A1* | 2/2011 | Halasipuram | G06F 16/24549 707/720 |
| 2011/0113059 A1* | 5/2011 | Lee | G06F 16/1873 707/769 |
| 2011/0238655 A1* | 9/2011 | Colrain | G06F 16/24524 707/718 |
| 2011/0302222 A1* | 12/2011 | Kucera | G06F 16/212 707/805 |
| 2012/0079004 A1* | 3/2012 | Herman | G06F 40/205 707/E17.044 |
| 2012/0089610 A1* | 4/2012 | Agrawal | G06F 16/20 707/741 |
| 2012/0143917 A1* | 6/2012 | Prabaker | G06F 16/00 707/E17.107 |
| 2012/0191699 A1* | 7/2012 | George | G06F 16/24554 707/718 |
| 2013/0018869 A1* | 1/2013 | Hanson | G06F 16/951 707/E17.014 |
| 2013/0198184 A1* | 8/2013 | Wu | G06F 16/284 707/736 |
| 2014/0006411 A1* | 1/2014 | Boldyrev | G06F 16/2455 707/741 |
| 2014/0082011 A1* | 3/2014 | Lopitaux | G06F 16/24534 707/765 |
| 2014/0095446 A1* | 4/2014 | Deshmukh | G06F 16/24568 707/661 |
| 2014/0095540 A1* | 4/2014 | Hsiao | G06F 16/2455 707/774 |
| 2014/0123129 A1* | 5/2014 | Risbood | G06F 9/44505 717/176 |
| 2014/0337315 A1* | 11/2014 | Slezak | G06F 16/1744 707/718 |
| 2014/0380286 A1* | 12/2014 | Gabel | G06F 8/20 717/139 |
| 2015/0006508 A1* | 1/2015 | Slezak | G06F 16/1744 707/718 |
| 2015/0088812 A1* | 3/2015 | Ziauddin | G06F 16/21 707/609 |
| 2015/0269247 A1* | 9/2015 | Herold | G06F 16/288 707/756 |
| 2015/0278243 A1* | 10/2015 | Vincent | G06F 16/182 707/634 |
| 2015/0278397 A1* | 10/2015 | Hendrickson | G06F 16/9024 707/798 |
| 2015/0379144 A1* | 12/2015 | Wong | G06F 16/9535 707/754 |
| 2016/0004621 A1* | 1/2016 | Gongloor | G06F 11/3452 707/688 |
| 2016/0098446 A1* | 4/2016 | Dickie | G06F 16/242 707/769 |
| 2016/0098451 A1* | 4/2016 | Dickie | G06F 16/2465 707/718 |
| 2016/0162599 A1* | 6/2016 | Dickie | G06F 16/9017 707/769 |
| 2016/0179869 A1* | 6/2016 | Hutchins | G06F 16/211 707/703 |
| 2016/0179900 A1* | 6/2016 | Stefik | G06F 16/2379 707/771 |
| 2016/0180729 A1* | 6/2016 | Boyer | G06F 16/2455 434/350 |
| 2016/0328449 A1* | 11/2016 | Fa | G06F 16/282 |
| 2017/0039260 A1* | 2/2017 | Adya | G06F 16/27 |
| 2017/0102931 A1* | 4/2017 | Risbood | G06F 9/5072 |
| 2017/0103106 A1* | 4/2017 | Kass | G06F 16/2423 |
| 2017/0116275 A1* | 4/2017 | Baggett | G06F 16/24549 |
| 2018/0048653 A1* | 2/2018 | Nerurkar | G06F 21/6227 |
| 2019/0065545 A1* | 2/2019 | Hazel | G06F 16/2282 |
| 2019/0102412 A1* | 4/2019 | Macnicol | G06F 16/2456 |
| 2019/0138743 A1* | 5/2019 | Nerurkar | G06N 20/10 |
| 2022/0269680 A1* | 8/2022 | Li | H04L 67/1008 |

\* cited by examiner

COMPUTATIONAL DEPENDENCY DIRECTORY

TECHNICAL FIELD

This disclosure relates generally to data processing and, in particular, to generation of a computation dependency directory among various objects for the purposes of query plan generation and/or optimization.

BACKGROUND

Database management systems have become an integral part of many computer systems. For example, some systems handle hundreds if not thousands of transactions per second. On the other hand, some systems perform very complex multidimensional analysis on data. In both cases, the underlying database may need to handle responses to queries very quickly in order to satisfy systems requirements with respect to transaction time. Given the complexity of these queries and/or their volume, the underlying databases face challenges in order to optimize performance, including using cached data that may have been previously generated in response to other queries.

SUMMARY

In some implementations, the current subject matter relates to a computer implemented method for generating a computational dependency directory and executing a query on a database using generated computational dependency directory. The method may include storing a data object in a plurality of data objects in a database storage location, the data object including a dependency parameter being indicative of the stored data object being dependent on at least another data object in the plurality of data objects; receiving a query to access the stored data object in the plurality of data objects; determining, using the dependency parameter, whether the stored data object is responsive to the received query; generating, based on the determining and the received query, a query execution plan; and executing the query using the query execution plan.

In some implementations, the current subject matter can include one or more of the following optional features. The dependency parameter may be indicative of at least one of the following: a physical dependency of the stored data object on at least another data object in the plurality of data objects, a logical dependency of the stored data object on at least another data object in the plurality of data objects, and any combination thereof.

In some implementations, the stored data object may be a cached data object stored in the database storage location and being generated in response to executing at least another received query.

In some implementations, the dependency parameter may be determined based on a predetermined type of the stored data object. The predetermined type of the stored data object may be associated with at least one of the following: a session dependency, a user dependency, a hierarchy dependency, an analytic privilege dependency, a built-in function dependency, a general view dependency, an order dependency, and any combination thereof. Further, generation of the query execution plan may include preventing access to the stored data object during execution of the received query upon determining that the dependency parameter is associated with the predetermined type of the stored data object.

In some implementations, generation of the query execution plan may include allowing access to the stored data object.

Non-transitory computer program products (i.e., physically embodied computer program products) are also described that store instructions, which when executed by one or more data processors of one or more computing systems, causes at least one data processor to perform operations herein. Similarly, computer systems are also described that may include one or more data processors and memory coupled to the one or more data processors. The memory may temporarily or permanently store instructions that cause at least one processor to perform one or more of the operations described herein. In addition, methods can be implemented by one or more data processors either within a single computing system or distributed among two or more computing systems. Such computing systems can be connected and can exchange data and/or commands or other instructions or the like via one or more connections, including but not limited to a connection over a network (e.g., the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

DETAILED DESCRIPTION

Figure 1:
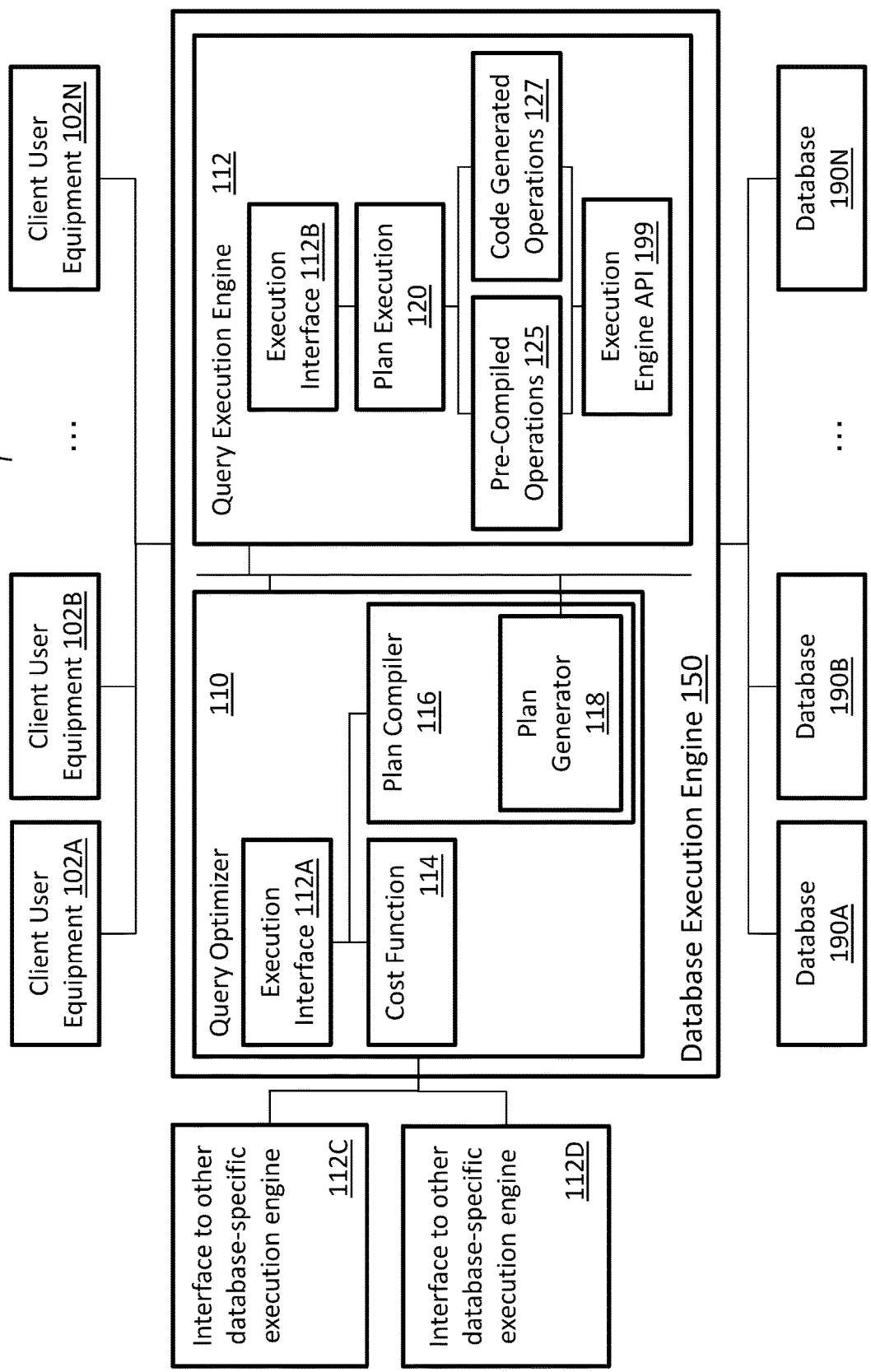
FIG. 1 illustrates an exemplary block diagram for a system, according to some implementations of the current subject matter.

To address these and potentially other deficiencies of currently available solutions, one or more implementations of the current subject matter relate to methods, systems, articles of manufacture, and the like that can, among other possible advantages, provide an ability to generate and store a computation dependency directory that may be accessed during query plan generation and/or optimization processes.

Database management systems and operations performed on the data managed by a database management system have become increasingly complex. For example, a database management systems (or database for short) can support relatively complex online analytical processing (OLAP, which can perform multi-dimensional analysis) to more straightforward transaction based online transaction processing (OLTP). Moreover, the database may be configured as a row-store database or column store database, each of which may have certain aspects with respect to queries and other operations at the database. For example, the database may encode data using dictionaries, while some databases may not. In addition to these various databases layer differences, the queries performed at a database can comprise a complex sequence of operations in order to generate corresponding responses. To implement the complex sequence, a query execution plan (or query plan for short) may be implemented. The query plan represents a sequence of operations, such as instructions, commands, and/or the like, to access data in the database. The database may also include a query plan optimizer to determine an efficient way to execute the query plan.

From an application or client perspective, it can be extremely cumbersome to access databases. For example, an application may need to query different types of databases using complex queries. As a consequence, the application layer in this example would need to be configured to handle the various types of databases and the various query types. Additionally or alternatively, each database may need to process queries from the application into a format and structure that can be handled by the given database. Pushing complex operations and support for a variety of different database types to the application layer may contravene the need to have relatively lighter weight and/or readily deployable applications. On the other hand, pushing complex operations to the database layer where data is stored may draw processing and/or memory resources at the database and may thus reduce the performance and response times for queries on that database layer.

In some example implementations, there may be provided an execution engine that may decouple the higher-level, application layer from the database layer (e.g., the persistence or storage layer where data including database tables may be stored and/or queried using instructions, such as commands and/or the like). The execution engine may be implemented separately from the database layer and/or the application layer. Further, the execution engine may be configured to receive a query, generate a query plan (including for example query algebra), optimize the query plan, and/or generate executable code, which can be executed at runtime. The executable code may include pre-compiled code (which can be selected for certain operations in the query plan) and/or code that is generated just-in-time specifically for execution of the query plan.

The execution engine may be configured to perform some operations itself, while the execution engine may send some operations (e.g., relatively basic commands, such as reads, writes, scans, and/or the like) to the database layer. Further, the execution engine may receive corresponding responses from the database layer where data is stored/persisted and certain commands, such as reads, writes, scans, and/or the like, can be performed. The execution engine may perform more complex execution operations, such as rule-based operations including relatively more complex operations such as joins, projections, and/or the like, while accessing the database's storage/persistence layer when needed to read, write, update, and/or perform other operations.

The execution engine may be configured to support a wide range of database types to reduce, if not eliminate, the need for specialized execution engines for each type of database. For example, rather than having an execution engine for each type of database (e.g., an execution engine for an OLAP database, another execution engine for an OLTP database, an execution engine for a row-store database, an execution engine for a column-store database, and/or the like), the execution engine can perform query execution for a variety of database types and send queries to the different types of database layers (and/or their storage/persistence layer) and handle the corresponding responses.

FIG. 1 illustrates an exemplary system 100, in accordance with some example implementations. The system 100 may include one or more user equipment 102A-N, such as a computer, a smart phone, a tablet, an Internet of Things (IoT) device, and/or other computer or processor-based devices. The user equipment may include a user interface, such as a browser or other application to enable access to one or more applications, database layer(s), and/or databases, to generate queries to one or more databases 190A-N, and/or to receive responses to those queries.

In the example of FIG. 1, the databases 190A represent the database layer of a database management system where data may be persisted and/or stored in a structured way, and where the data can be queried or operated on using operations including SQL commands or other types of commands/instructions to provide reads, writes, and/or perform other operations. To illustrate by way of an example, user equipment 102A-N may send a query via an execution engine 150 to the database layer 190A-B, which may represent a persistence and/or storage layer where database tables may be stored and/or queried. The query may be sent via a connection, such as a wired and/or wireless connection (e.g., the Internet, cellular links, WiFi links, and/or the like).

The database execution engine 150 may include a query optimizer 110, such as a SQL optimizer and/or another type of optimizer, to receive at least one query from a user equipment and generate a query plan (which may be optimized) for execution by the execution engine 112. The query optimizer 110 may receive a request, such as a query, and then form or propose an optimized query plan. The query plan (which may be optimized) may be represented as a so-called "query algebra" or "relational algebra."

For example, SELECT Columns from Table A and Table B, and perform an INNER JOIN on Tables A and B may represent a query received by the database execution engine 150 including the query optimizer 110. There may be several ways of implementing execution of this query. As such, the query plan may offer hints or propose an optimum query plan with respect to the execution time of the overall query. To optimize a query, the query plan optimizer 110 may obtain one or more costs for the different ways the execution of the query plan can be performed. The costs may be obtained via the execution interface 112A from a cost function 114, which responds to the query optimizer 110 with the cost(s) for a given query plan (or portion thereof), and these costs may be in terms of execution time at the database layer 190A-N, for example.

The query optimizer 110 may form an optimum query plan, which may represent a query algebra, as noted above. To compile a query plan, the query optimizer 110 may provide the query plan to the query plan compiler 116 to enable compilation of some, if not all, of the query plan. The query plan compiler 116 may compile the optimized query algebra into operations, such as program code and/or any other type of command, operation, object, or instruction. This code may include pre-compiled code (which can be pre-compiled and stored, and then selected for certain operations in the query plan) and/or just-in-time code generated specifically for execution of the query plan. For example, plan compiler may select pre-compiled code for a given operation as part of the optimization of the query plan, while for another operation in the query plan the plan compiler may allow a compiler to generate the code. The pre-compiled and generated code represent code for executing the query plan, and this code may be provided to the plan generator 118, which interfaces the query execution engine 112.

In some implementations, the query optimizer 110 may optimize the query plan by compiling and generating code. Moreover, the query optimizer 110 may optimize the query plan to enable pipelining during execution.

In some implementations, the query optimizer 110 may be configured to select other execution engines. For example, the query optimizer 110 may select via interface 112C an execution engine configured specifically to support a row-store database or an ABAP type database, or the query optimizer 110 may select via interface 112D an execution engine configured specifically to support a column-store type database. In this way, the query optimizer 110 may select whether to use the universal database execution engine 150 or legacy (e.g., database-specific) execution engines (available via interfaces 112C/D, for example).

The query execution engine 112 may receive, from the plan generator 118, compiled code to enable execution of the optimized query plan, although the query execution engine may also receive code or other commands directly from a higher-level application or other device, such as user equipment 102A-N.

The query execution engine 112 may then forward, via an execution interface 112B, the code to a plan execution engine 120. The plan execution engine may then prepare the plan for execution, and this query plan may include pre-compiled code 125 and/or generated code 127. When the code for the query plan is ready for execution during runtime, the query execution engine 112 may step through the code performing some of the operations within the database execution engine 150 and sending some of the operations (or commands in support of an operation, such as a read, write, and/or the like) to the execution engine application programming interface (API) for execution at one or more of databases layers 190A-N.

Table 1 below depicts an example of a query execution plan including a (1) TableScan (Filter X=1) and a (2) Materialization (Columns A, B). In this example, the TableScan would result in one or more calls via the execution engine API 199 to one or more of databases 190A-B. Specifically, the TableScan operator at Table 1 would result in a call for a dictionary look up for a column "X" for the value ID (or "valueid" or "valueID", which, hereinafter, will be used interchangeably) of "1" and an indexvector scan with a valueid obtained from the dictionary look up, which results in a document ID (or "documentid" or "documentID", which, hereinafter, will be used interchangeably) list that identifies one or more rows in the table 1. Then for each document ID, a call is made via 199 to look up the value IDs for columns A and B. The value IDs may be used to look up dictionary values to materialize, the columns A and B including the actual data values for those columns.

TABLE 1

| Operator | Calls Made On Database API |
| --- | --- |
| 1) TableScan (Filter X = 1) | dictionary lookup column "X" for the "value of ID of 1" indexvector scan with a valueid from the lookup, which results in a document ID (docid) list that identifies one or more rows in table "1" |
| 2) Materialization (Columns A, B) | for each docid, lookup value IDs (valueids) for columns A + B for the valueids, lookup dictionary value in dictionaries of A and B |

In some implementations, the query execution engine 150 may, as noted, be configured to handle different types of databases and the corresponding persistent layers and/or tables therein. For example, the database 190N may be implemented as a row-oriented database, so that an insert is performed by adding a row with a corresponding row identifier, while another database 190A may be implemented as a column store database, which may use dictionaries and compressive techniques when inserting data into a table. In this example, the query execution engine 150 may perform execution related to handling the differences between these two types of databases.

This may enable a reduction in processing at the database layer 190A-N. Moreover, the query execution engine 150 may perform other operations including rule-based operations, such as joins and projections, as well as filtering, group by, multidimensional analysis, and/or the like to reduce the processing burden on the database layer. In this way, the query execution engine 150 may execute these and other complex operations, while the database's persistence/storage layer 190A-N can perform simpler operations to reduce the processing burden at the database's persistence/storage layer 190A-N.

In some implementations, the query execution engine 150 may run, as noted above, just-in-time code 127 generated for some query operations, while pre-compiled code 125 may be run for other operations. Moreover, the query execution engine 150 may combine the generated code 127 with pre-compiled code 125 to further optimize execution of query related operations. In addition, the query execution engine 150 may provide for a plan execution framework that is able to handle data chunk(s), pipelining, and state management during query execution.

In some implementations, the query execution engine may be configured to optimize query execution plans using one or more cached data and/or data objects, where such data/data objects may be dependent on one or more other data, data objects, metadata, etc. In general, caching may refer to an ability of applications to store one or more copies of one or more intermediate results of executed queries, where the queries may involve expensive computational runtime. Caching may avoid expensive re-computation and instead, allow use of a previously determined copy.

However, with caching, it may be difficult to determine when cached data cannot be used anymore, e.g., because an original base data used to determine cached data values may have been updated and, thus, stored copies of data values no longer reflect data's current state. It is important to know all the database tables involved in the computation to listen for changes.

Further, with caching, it may be difficult to determine how to build a cache key, which may refer to an identifier that may be used to determine which cached data value(s) to retrieve from one or more stored local copies of data based on a particular context. Having a cache key that does not include enough information might identify a wrong copy of a cached result. For example, some queries may produce different results depending on the current database user (as discussed below). If an application caches result(s) of such queries without adding additional information to the cache key (e.g., that either identifies the current user and/or actual user's data visibility pattern (e.g., thereby allowing different users with same data visibility use the same cache entries)), then it might not lookup a correct result and, instead, return a wrong result to the requester. Also, using too much information for a cache key might result in the same value stored in multiple redundant copies, thereby needlessly consuming system memory.

The following code provides an example of a database-view having a user-specific content that may be used to illustrated the above issues with caching.

```
CREATE TABLE T_USER_AUTHORIZATION    (USER_NAME  VARCHAR(100),
PRIVILEGE_LEVEL INTEGER );
INSERT INTO T_USER_AUTHORIZATION VALUES ('USER_A', 1);
INSERT INTO T_USER_AUTHORIZATION VALUES ('USER_B', 2);
CREATE TABLE T_CLASSIFIED_INFO   (PRIVILEGE_LEVEL INTEGER, INFORMATION
NVARCHAR(100));
INSERT INTO T_CLASSIFIED_INFO VALUES (1, 'PUBLIC_INFO');
INSERT INTO T_CLASSIFIED_INFO VALUES (2, 'INTERNAL_INFO');
INSERT INTO T_CLASSIFIED_INFO VALUES (3, 'CONFIDENTIAL_INFO');
CREATE VIEW V_USER_SECURITY_LEVEL   as   SELECT PRIVILEGE_LEVEL   FROM
T_USER_AUTHORIZATION WHERE USER_NAME = CURRENT_USER;
CREATE VIEW V_INFO as SELECT * FROM T_CLASSIFIED_INFO AS INFO
   WHERE  PRIVILEGE_LEVEL  <=  (SELECT  PRIVILEGE_LEVEL  FROM
T_USER_AUTHORIZATION
      WHERE USER_NAME = CURRENT_USER);
```

The below query SELECT*FROM V_INFO may generate different results depending on which USER "owns" the database connection (e.g., associated with, has access privileges, etc.).

```
CONNECT USER_A PASSWORD Init1234;
SELECT * FROM V_INFO;
-- result:
-- PRIVILEGE_LEVEL,INFORMATION
-- 1,PUBLIC_INFO
CONNECT USER_B PASSWORD Init1234;
SELECT * FROM V_INFO;
-- result:
-- PRIVILEGE_LEVEL,INFORMATION
-- 1,PUBLIC_INFO
-- 2,INTERNAL_INFO
```

If the query V_INFO takes a long time to generate results, it may be helpful to cache any results in an application. The application may need to be aware that any result generated by this query are user-specific (e.g., USER_A, USER_B) in order to build a valid cache key. Currently, in order to have a unique mapping, a current user name may be included into the cache key. This means that the local copy store may need to maintain an own copy for each user, i.e., a cache key for USER_A: "SELECT*FROM V_INFO; USER_A", and a cache key for USER_B: "SELECT*FROM V_INFO; USER_B".

Moreover, with caching it might be difficult to determine whether caching is actually possible for a current query. For example, a query might need to read data from a randomized data source, and it might be required, e.g., for security and/or privacy-preserving anonymization techniques, that, each time, an application executes such query, it is based on a fresh set of random numbers. Further, a query might read from a data source for which the database does not support caching, because of, for instance, technical limitations. An example of such can be a remote table linked to another database system, which has no support of signaling changes in the data to the current database.

Additionally, with regard to caching, an application may be configured to read data from various sources dynamically, and not only a fixed view, e.g., V_INFO, as used in the example above. This read process may depend on configuration settings, user input, etc., thus, evaluation of the properties of views, e.g., V_INFO, might not be possible at application development time. Instead, one or more frameworks that can determine this automatically at runtime, for efficiency and to avoid errors may be needed. In some implementations, developers may sometimes include a parameter CURRENT_USER into the cache keys. However, multiple identical copies of the values may then need to be maintained, which might be unnecessary. Further, memory consumption may present an issue where there are many users, each performing similar and/or identical queries.

To resolve the above issues, a caching-enabled computing component may need to be fully aware of a complete list of computational elements that may influence result(s) of a query as well as mathematical properties of these elements (e.g., also referred to as idempotency), which may, in turn, be referred as dependencies of a query.

Conventional databases store a hierarchy of repository objects (e.g., database tables, views, procedures, calculation scenarios) in a central catalog with a well-defined interface. This might be referred to as a structural dependency directory. While this information is important for caching, other important information may be missing, which may include, for example, information associated with dependencies to sources of input that are not other repository objects (e.g., session variables and/or built-in functions/clauses, such as, SYSUUID) and/or dependencies that may be dynamic and/or user-specific (e.g., analytic privileges, which may be dynamically injected into a query plan by an SQL execution engine) are not available in a consolidated and/or well-defined way. These dependencies may be referred to as computational dependencies. As stated above, such information may be needed, for instance, for decisions concerning caching, but may also be useful for a query plan optimization. As such, the central catalog that may store the above dependencies may be referred to as computational dependency directory.

As currently there is no computational dependency directory, there may exist internal, object-specific application programming interfaces (APIs) that may allow components of a database to query information about extended properties, e.g., determinism and/or caching support. Such object-specific APIs may be built by developers on as-needed basis that may be independent from each other. For example, an API provided in calculation scenarios to declare that they might be cached. This API may return a Boolean value, which may signal that "no caching is possible" if the calculation view is using session variables. This may prevent caching but it may be easily performed if the dependency to the session variables was known and may be communicated to the requester.

Having individual, object specific APIs may lead to inconsistent terminology, granularity and/or technical assumptions, etc., and thus, a lack of orthogonality, thereby making computing of consolidated attributes across an entire hierarchy of objects difficult and/or error prone, e.g., some computing components may use a term "cacheable", others—"deterministic", yet others may declare "idempotency". Moreover, some components may require a stable result order for a "deterministic" property, while others do not. Further, as different kinds of database objects consume various other database objects (e.g., due to the flexibility of SQL), such object-specific APIs may need to be called during many instances in a database (e.g., causing n*m code complexity of possible connections between different object types). Some components' APIs may recursively evaluate their dependencies, while others may only provide information for the current object but not its dependent ones.

An additional example for the above may include an analytic privilege object(s) that may provide a 4-value property is_deterministic( ), which may include one or more of the following values: DETERMINISTIC, NON_DETERMINISTIC, SESSION_USER_DETERMINISTIC and CURRENT_USER_DETERMINISTIC. Analytic privileges provide an additional dependency-resolving API to determine which analytic privileges are defined on a particular dependent view for a given user. Some computing systems and/or components may use these APIs to determine privilege-related "extra" dependencies for cache key building and/or enumeration of additional tables needed to track for cache entry invalidation.

In some implementations, to resolve the above, the current subject matter may be configured to provide a computational dependency directory object that may be used to determine one or more dependencies of database object(s) to everything involved in the computation of the output the database objects provide. Thus, a hierarchical processing of the V_INFO using the computational dependency directory may determine that there is a dependency on a CURRENT_USER (directly and/or indirectly).

In some implementations, the process of updating such computational dependency directory may be initiated at the time of repository object creation (e.g. during the CREATE VIEW statement), where dependency on the CURRENT_USER may be supplied/published into the computational dependency directory. Additionally, structural dependencies, as maintained in a global dependency directory, may be incorporated as well. In some example, non-limiting, implementations, a database may determine to store all kinds of dependencies in a single directory, and/or it might maintain separate directories for structural and computational dependencies. At the time of object deletion (e.g. during DROP VIEW statement), dependencies of the object may be deleted from the computational dependency directory.

In some implementations, the computational dependency directory may be exposed using a custom API and/or using an SQL view. For example, the OBJECT_DEPENDENCIES view may allow navigation in an object hierarchy. Moreover, the current subject matter may be configured to include one or more further types of dependencies in addition to the structural dependencies already. Additionally, non-structural (e.g., computational) dependencies may also be included into the view. Some example non-structural dependencies may include, but are not limited to session variables, references to calendars, logical clocks, unique ID-generators, and other system dependencies that may influence visibility of data (e.g., "analytic privilege" dependency that may be a user-specific filter that may be connected to a view).

An SQL view, like OBJECT_DEPENDENCIES, may display computational dependencies using a distinguished DEPENDENCY_TYPE column, in order to distinguish structural and computational dependencies. In Table 2 (resulting from execution of the query below), an exemplary dependency type 100 may represent a new kind of logical dependency to CURRENT_USER.

```
SELECT BASE_OBJECT_TYPE, BASE_OBJECT_NAME, DEPENDENT_OBJECT_NAME,
DEPENDENCY_TYPE, DEPENDENT_OBJECT_TYPE FROM OBJECT_DEPENDENCIES
WHERE BASE_OBJECT_NAME = 'V_INFO' OR DEPENDENT_OBJECT_NAME = 'V_INFO';
```

TABLE 2

Result Table.

| BASE_OBJECT_TYPE | BASE_OBJECT_NAME | DEPENDENT_OBJECT_NAME | DEPENDENT_OBJECT_TYPE | DEPENDENCY_TYPE |
|---|---|---|---|---|
| TABLE | T_CLASSIFIED_INFO | V_INFO | VIEW | 1 |
| TABLE | T_USER_AUTHORIZATION | V_INFO | VIEW | 1 |
| CURRENT_USER | | V_INFO | VIEW | 100 |

The above Result Table may indicate that a specific view (V_INFO) is referencing the CURRENT_USER symbol, as well as tables T_CLASSIFIED_INFO and T_USER_AUTHORIZATION. In this example, CURRENT_USER may be an own object type. For session variables, one may assume, for example, that there is an object type "SESSION_CONTEXT" and object name depending on the name of the variable used.

In some implementations, use of the above dependency information as incorporated into the computational dependency directory may be configured to provide centralized services. This may include a central cache key generation service, thereby moving cache related program code (e.g., recursive dependency analysis and cache key building) away from individual components to a central place. Moreover, this may include a central service for determining mathematical properties of a whole object hierarchy that may be needed for optimizing query plans, e.g., for the shared view unfolding. For example, a shared view (e.g., a view that may be used multiple times in the same query) may be unfolded (e.g., the view's inner plan may be in-lined multiple times into the main query plan) only if all copies, when executed individually, producing identical results (including the sort order).

In some implementations, the current subject matter's computational dependency directory may be configured to specify one or more predicate for a dependency, such as, for example, to indicate that a particular dependency relation is only relevant for a specific user. This may be relevant for the purposes of analytical privileges, where the privileges may be objects themselves, and may be dynamically assigned to specific users. For example, a connection between view VIEW_1 and an analytic privilege AP_CONFIDENTIAL may only apply to USER_A, but not to USER_B. These connections may be part of a computational dependency.

Further, the computational dependency directory may be configured to list and/or enumerate various types of built-in anchor-objects. An anchor-object may be linked by a VIEW and/or any other database object. Some examples of the anchor-type objects may include, but are not limited to, an entire session context (SESSION_CONTEXT), a single session variable (SESSION_VARIABLE), a source of randomness (RANDOM), a unique ID generator (UUID), a remote system parameter type (REMOTE_SYSTEM), current time (CURRENT_TIME), current user (CURRENT_USER), session user (SESSION_USER), an analytic privilege (ANALYTIC_PRIVILEGE), and/or any others. For example, when caching data, a connection to RANDOM anchor object may indicate that no caching is possible, because the result may be partly random and may be different for each query. Further, a connection to SESSION_CONTEXT anchor object may indicate that an entire session context may need to be incorporated into a cache key (e.g., because the referenced session variable name is not known in advance). In connection with query plan optimization, a STABLE_ORDER anchor object may indicate that the result of a view may always be totally ordered.

Figure 2:
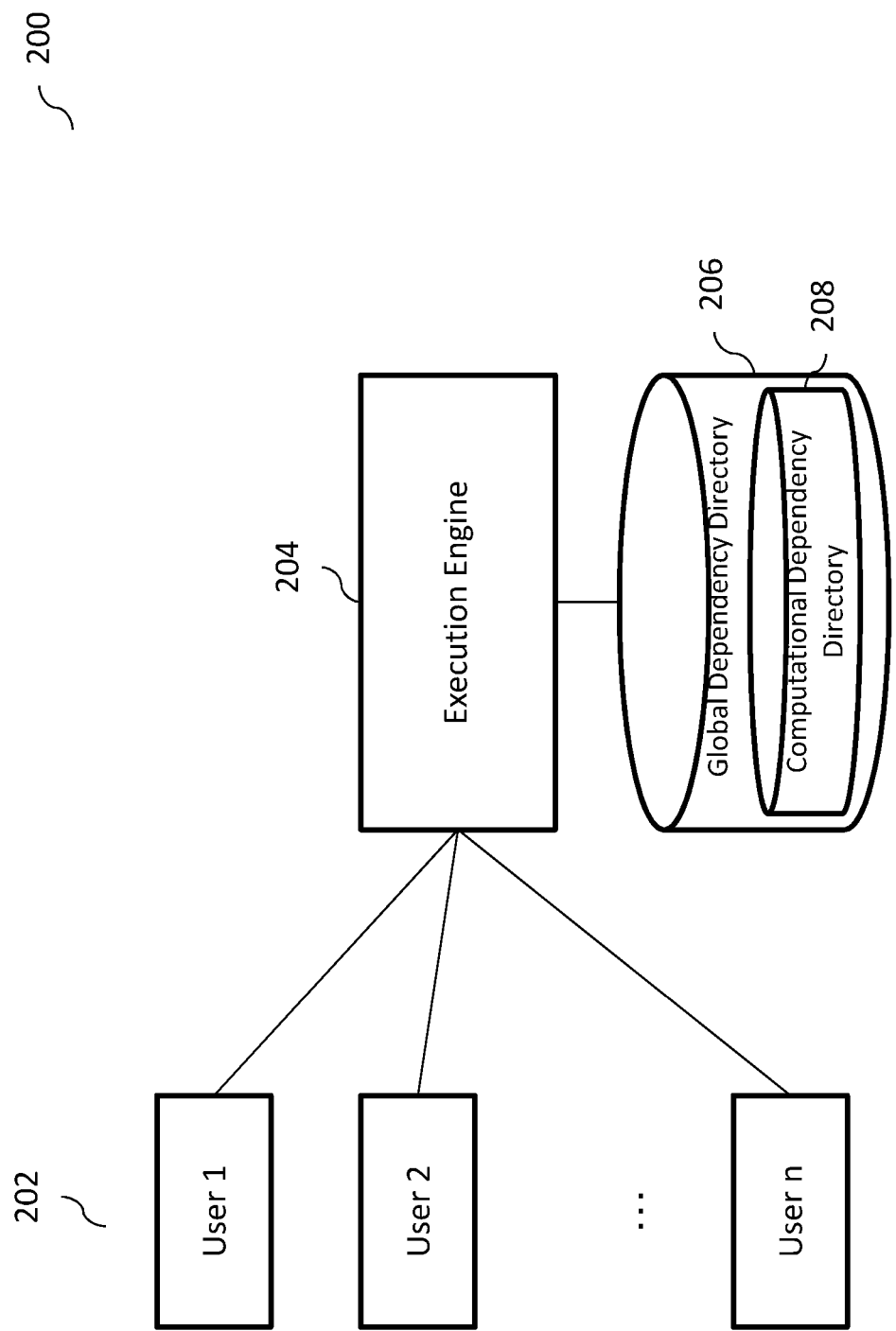
FIG. 2 illustrates an exemplary system for generating and/or implementing a computational dependency directory, according to some implementations of the current subject; matter

FIG. 2 illustrates an exemplary system 200 for generating and/or implementing a computational dependency directory, according to some implementations of the current subject matter. The system 200 and/or any portions thereof may be configured to be incorporated into the system 100 shown in FIG. 1.

The system 200 may be configured to operate in one or more clustered computing environments (e.g., Kubernetes), one or more cloud environments, etc. It may include one or more users, entities, applications, etc. 202 (e.g., user 1, user 2, . . . , user n, etc.), which may include one or more end-users, administrator users, etc. that may be configured to access system 200 using one or more browsers, user interfaces, application interfaces, and/or any other interfaces. It may also include a process engine/system 204. The engine 204 may be configured to be similar to the database execution engine 150 shown in FIG. 1. It may include one or more computing elements (which may, for example, include one or more processors, one or more servers, one or more computing engines, one or more memory and/or storage locations, one or more databases, etc.). The engine 204 may also be communicatively coupled one or more databases 206 that may store a global dependency directory of objects, as discussed above. The database 206 may also store a computation dependency direction 208 which may be configured to store information about structural and/or non-structural dependencies that may be used to determine whether cached data (e.g., as stored in the database 206) may be used in response to a query provided by one or more users 202 to the engine 204. Various components of the system 200 may be communicatively coupled using various communication protocols, including but not limited to REST protocol, HTTP protocol, OData protocol, SOAP protocol, etc. Moreover, the system 200 may be configured to include one or more application programming interfaces for ensuring connectivity among various elements of the system 200.

The engine 204 may include a processor, a memory, and/or any combination of hardware/software, and may be configured to allow one or more users 202 to communicate with the engine 204, such as, for the purposes of receiving a query to access certain data in the database 206. The engine 204 and/or database 206 may include one or more or specific software applications, one or more computing processes, one or more computing steps that may be executed by one or more processors, along with any associated data and/or content, and/or any configuration data that may specify one or more functions and/or features of the software application(s), data and/or content. In some cases, the engine 204 and/or database 206 may be configured to rely on data, functions and/or features (and/or any combination thereof) of a computing component such that the process is an integration and/or a combination of one or more computing components, processes, etc. A computing component may refer to a software code that may be configured to perform a particular function, a piece and/or a set of data (e.g., data unique to a particular accounting process and/or data available to a plurality of accounting processes, and/or any other processes) and/or configuration data used to create, modify, etc. one or more software functionalities. The system 204 may include one or more artificial intelligence and/or learning capabilities that may rely on and/or use various data, e.g., various existing parameters, historical data associated with querying data, users, caching and/or cached data, dependencies, etc.

The elements of the system 200 may be communicatively coupled using one or more communications networks. The communications networks can include at least one of the following: a wired network, a wireless network, a metropolitan area network ("MAN"), a local area network ("LAN"), a wide area network ("WAN"), a virtual local area network ("VLAN"), an internet, an extranet, an intranet, and/or any other type of network and any combination thereof.

Moreover, the elements of the system 200 may include any combination of hardware and/or software. In some implementations, the elements may be disposed on one or more computing devices, such as, server(s), database(s), personal computer(s), laptop(s), cellular telephone(s), smartphone(s), tablet computer(s), and/or any other computing devices and/or any combination thereof. In some implementations, the elements may be disposed on a single computing device and/or can be part of a single communications network. Alternatively, the elements may be separately located from one another.

As stated above, the user 202 may be an end user (e.g., a business user), and/or an administrator user. The end user 202 may be configured to use various tools that may be available to the user 202 in defining a particular process 214 and/or requesting execution of particular process(es) and/or process(es) within a particular process domain (e.g., quarterly reports, etc.). The users 202 may be configured to cause (e.g., via one or more user interfaces associated with engine 204) definition, implementation, and/or execution of one or more processes 214.

The database 206 may be configured to store data/information about dependencies between one or more metadata objects. The metadata may include data/information about which views and/or database tables a specific procedure may consume. These may be used whenever a whole hierarchy of related objects may need to be processed in a consistent way, e.g., during EXPORT/IMPORT, DROP cascade, and/or for propagating changes and/or revalidations through a network of objects after modification of a base table.

The database 206 may allow access to structural and computational object dependency information via one or more application program interfaces and/or via monitoring and/or developer views. The monitoring views may allow evaluation of the object hierarchy via SQL. For example, a query SELECT*FROM OBJECT_DEPENDENCIES may generate the following result table illustrating dependencies of objects. The view may be structured as a linearized hierarchy. The current dependency types may be structural and represent direct dependencies (e.g., DEPTYPE 1) and/or indirect dependencies (e.g., DEPTYPE 2). Table 3 illustrates various object dependencies.

the computation dependency directory 208 and/or database 206 to determine whether cached data (e.g., resulting from previous query execution(s)) that may be stored in the database 206 may be used in response to another query. This component 312 may determine whether a particular data is user-, application-, etc. specific and thus, might not be used in response to a newly-received query. Such determination may be made based on an analysis of various dependencies that may be associated with the stored data. A determination of whether dependencies may be involved with regard to the cached data may be ascertained based on, for example, analysis of query parameters, stored data, etc. Once a determination is made with regard to dependencies of associated with queried data, a query execution plan associated received query may be optimized using query plan optimizer component 314.

The query plan optimizer component 314 may be used to determine an appropriate query execution plan in view of the determined dependencies. The dependencies (e.g., from objects, such as calculation views 302, analytic privileges 304, hierarchy data 306, built-in function information 308, views 310, etc.) may be published into the computational dependency directory 208.

TABLE 3

Object Dependencies.

| BASE_OBJECT_TYPE | BASE_OBJECT_NAME | DEPENDENT_OB-JECT_NAME | DEPENDENT_OB-JECT_TYPE | DEPENDENCY_TYPE |
|---|---|---|---|---|
| TABLE | T_CLASSIFIED_INFO | V_INFO | VIEW | 1 |
| TABLE | T_USER_AUTHORIZATION | V_INFO | VIEW | 1 |
| CURRENT_USER | | V_INFO | VIEW | 100 |

As shown in Table 3, there may be different types of dependencies among objects (e.g., 'TABLE', and 'SYNONYM', 'VIEW'). The dependencies may differ in accordance with the schemas that may be associated with how objects may be stored in the databases.

Figure 3:
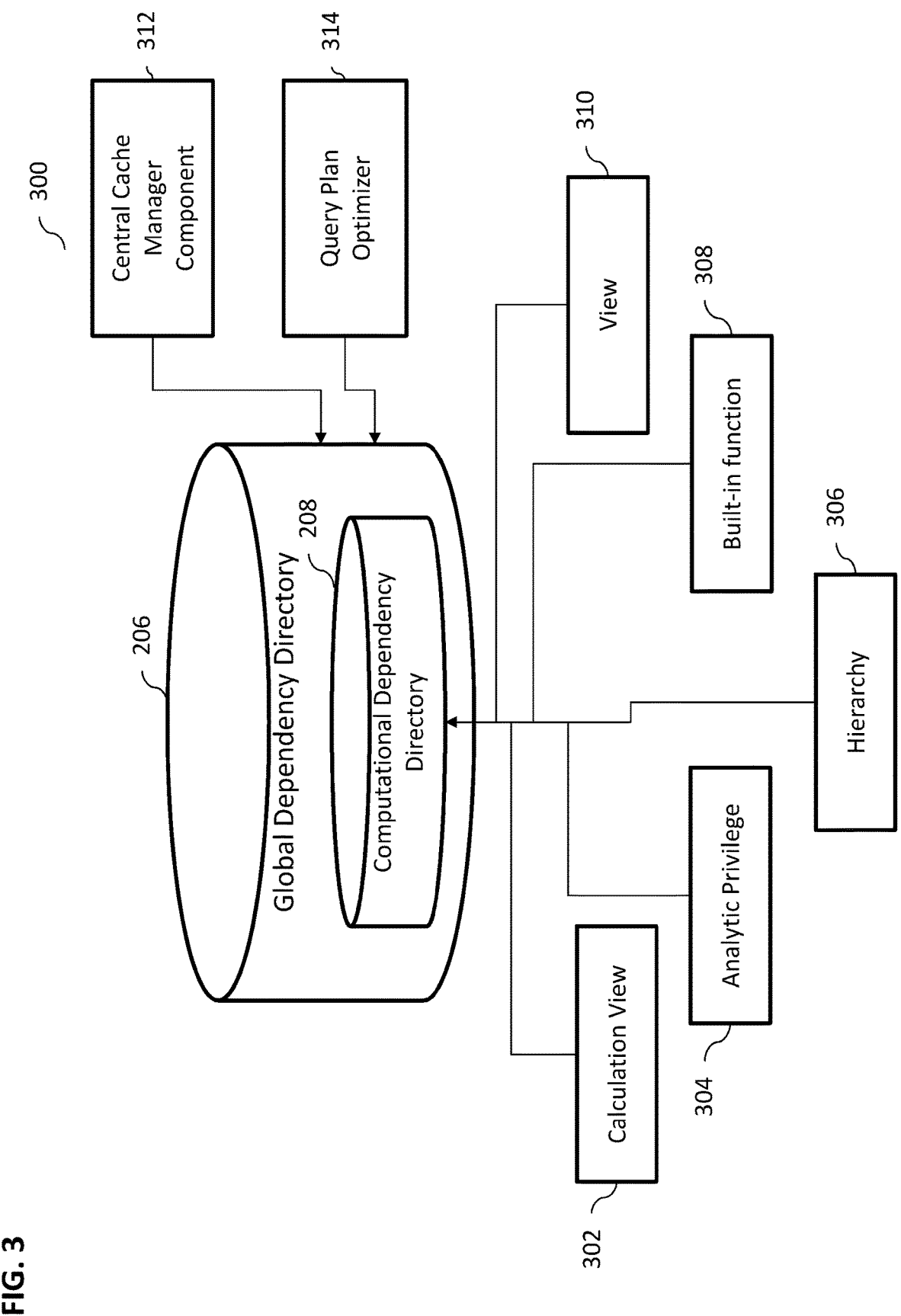
FIG. 3 illustrates an exemplary logical structure of the database shown in FIG. 2 that may include the computational dependency directory shown in FIG. 2, according to some implementations of the current subject matter.

The database 206 and, in particular, the computational dependency directory 208 may also be configured to store information about logical dependencies in addition to the physical dependencies information. Such logical dependencies, as discussed above, may include, for example, session variables, computational elements along with their mathematical characteristics (e.g., RANDOM function and a characteristic of being NOT IDEMPOTENT). This information may be exposed via a programmatic interface and/or monitoring views using computation dependency director 208. FIG. 3 illustrates an exemplary logical structure 300 of the database 206 that may include the computational dependency directory 208, according to some implementations of the current subject matter. As shown in FIG. 3, database objects stored in the database 206 may be configured to also store their logical dependencies.

The database 206 may be accessed by a central cache manager component 312 that may use information stored in For example, in current implementation, calculation view and/or calculation scenarios 302 may include a Boolean property is cacheable( ) to indicate whether or not they may be cacheable. The property returns FALSE if the scenario uses a session variable. Using the computational dependency directory 208, dependency to session variables may be indicated and caching may be enabled by including values of session variables into a cache key. Table 4 below illustrates such session variable dependencies that may be included in the computational dependency directory 208. As shown in Table 4, computational directory entries may link MYPROC scenario/procedure to USER_NAME and APP_NAME session variables. Adding the values of these variables into the cache keys may enable caching. Dependency type 100 may indicate a computational dependency.

TABLE 4

| 'SP6' | 'SYS' | MYPROC | PROC | — | USER_NAME | SESSION_VAR | 100 |
| 'SP6' | 'SYS' | MYPROC | PROC | — | APP_NAME | SESSION_VAR | 100 |

In some implementations, mathematical properties, e.g., idempotency, may, for example, be represented by an own class of object type MATH in the computational dependency directory 208, as, for example, indicated by the following Table 5. It may also be possible to document mathematical properties via an individual API and/or a separate view.

TABLE 5

| | | | | | | | |
|---|---|---|---|---|---|---|---|
| 'SP6' | 'SYS' | MYPROC | PROC | — | | RANDOM | 100 |
| 'SP6' | 'SYS' | MYPROC | PROC | — | | UUID | 100 |
| 'SP6' | 'SYS' | MYPROC | PROC | — | CURRENT_DATE | SESSION_VARIABLE | 100 |
| | | | UUID | — | NOT_IDEMPOTENT | MATH | 100 |
| | | | RANDOM | — | NOT_IDEMPOTENT | MATH | 100 |

As shown in Table 5, dependency to random numbers (i.e., RANDOM) and/or UUID generation (i.e., UUID) may be indicated (e.g., by "NOT_IDEMPOTENT", i.e., changed) to prevent caching of results of those functions. Thus, a query that may require access to data that may be generated by these functions would not use any cached results that may have been previously obtained as a result of execution of such functions.

Dependency to authorization objects may be stored in the computation dependency directory 208 to indicate that any previous result(s) associated with execution of queries may have been filtered. The authorization objects may indicate their own structural and computational dependencies, thereby indicating whether there is a dependency on a session user (i.e., SESSION_USER) parameter. Table 6 illustrates an exemplary current user dependency that may be stored in the computation dependency directory 208.

TABLE 6

| | | | | | | | |
|---|---|---|---|---|---|---|---|
| 'SP6' | 'SYS' | MYVIEW | VIEW | — | SOME_AP | ANALYTIC_PRIVILEGE | 100 |
| 'SP6' | 'SYS' | SOME_AP | ANALYTIC_PRIVILEGE | — | SESSION_USER | SESSION_VAR | 100 |
| 'SP6' | 'SYS' | SOME_AP | ANALYTIC_PRIVILEGE | — | T_GREENLIST | TABLE | 100 |

As shown in Table 6, dependency of view MYVIEW on an analytic privilege that uses the SESSION_USER variable to load a user-specific privilege list may be stored in the directory 208.

In some implementations, the current subject matter may be configured to provide a fully transparent view of functional metadata that may allow various functionalities, such as, for example, caching and/or optimizing to be executed in a centralized way. Further, instead of the conventional n*m private connections (as discussed above), only n connections to the directory 208 along with a central query evaluation may be needed, thereby reducing computational complexity and processing expense. Additionally, future database repository objects might not be required to provide various end-to-end API's dedicated to caching, optimization, determinism, and so on. Instead, the object may simply declare their computational attributes, and leave interpretation of these attributes to central processing components. Further, caching checks, cache key building, etc. may be generated as central, reusable components that may evaluate computation-enhanced object hierarchy to determine attributes for an entire hierarchy of related objects, which may be helpful for testing, maintenance, readability of code, etc. Additionally, it may be possible to deploy version checking using the following central approach. When a new repository object is developed that might not yet be handled by the existing repository objects' code related to publishing dependencies to the directory 208 (e.g., may be detected by compile-time version-checking of the directories interface), the version of the central directory 208 interface may be incremented, enforcing use of the updated interface and providing any additional information.

In some implementations, the current subject matter may be implemented in various in-memory database systems, such as a High Performance Analytic Appliance ("HANA") system as developed by SAP SE, Walldorf, Germany. Various systems, such as, enterprise resource planning ("ERP") system, supply chain management system ("SCM") system, supplier relationship management ("SRM") system, customer relationship management ("CRM") system, and/or others, may interact with the in-memory system for the purposes of accessing data, for example. Other systems and/or combinations of systems may be used for implementations of the current subject matter. The following is a discussion of an exemplary in-memory system.

Figure 4:
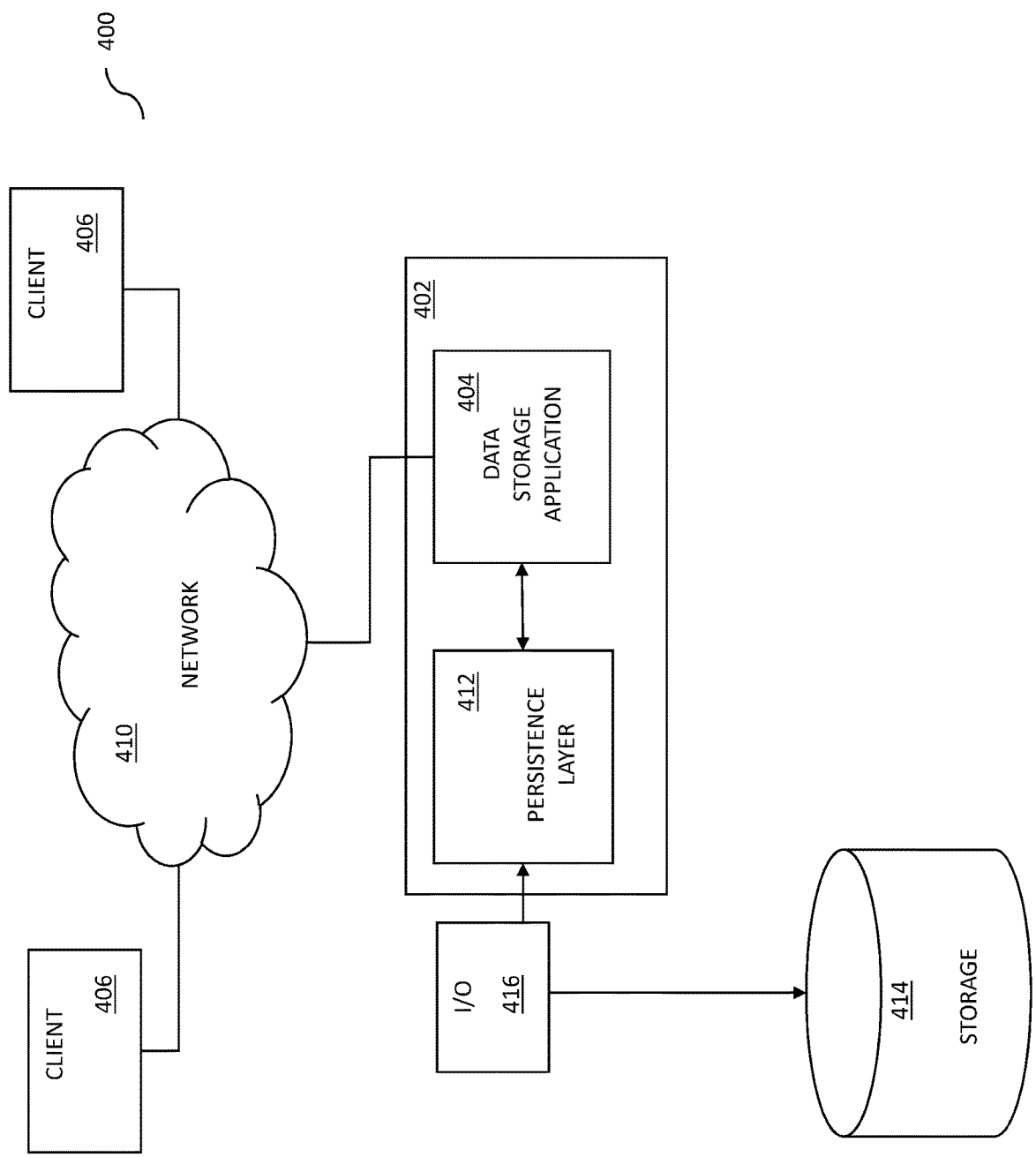
FIG. 4 is a diagram illustrating an exemplary system including a data storage application, according to some implementations of the current subject matter.

FIG. 4 illustrates an exemplary system 400 in which a computing system 402, which may include one or more programmable processors that may be collocated, linked over one or more networks, etc., executes one or more modules, software components, or the like of a data storage application 404, according to some implementations of the current subject matter. The data storage application 404 may include one or more of a database, an enterprise resource program, a distributed storage system (e.g. NetApp Filer available from NetApp of Sunnyvale, CA), or the like.

The one or more modules, software components, or the like may be accessible to local users of the computing system 402 as well as to remote users accessing the computing system 402 from one or more client machines 406 over a network connection 410. One or more user interface screens produced by the one or more first modules may be displayed to a user, either via a local display or via a display associated with one of the client machines 406. Data units of the data storage application 404 may be transiently stored in a persistence layer 412 (e.g., a page buffer or other type of temporary persistency layer), which may write the data, in the form of storage pages, to one or more storages 414, for example via an input/output component 416. The one or more storages 414 may include one or more physical storage media or devices (e.g. hard disk drives, persistent flash memory, random access memory, optical media, magnetic media, and the like) configured for writing data for longer term storage. It should be noted that the storage 414 and the input/output component 416 may be included in the computing system 402 despite their being shown as external to the computing system 402 in FIG. 4.

Data retained at the longer term storage 414 may be organized in pages, each of which has allocated to it a defined amount of storage space. In some implementations, the amount of storage space allocated to each page may be constant and fixed. However, other implementations in which the amount of storage space allocated to each page may vary are also within the scope of the current subject matter.

Figure 5:
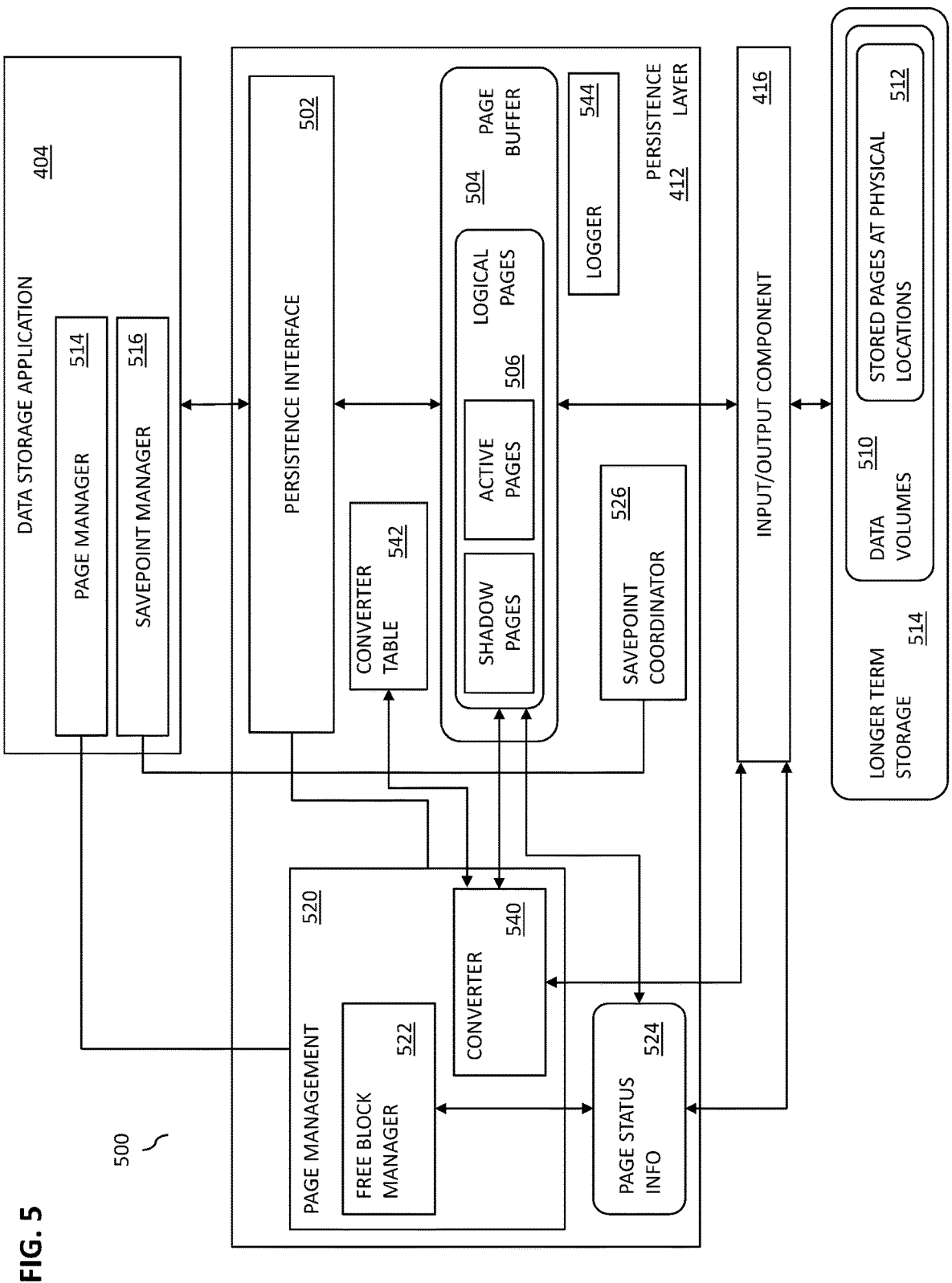
FIG. 5 is a diagram illustrating details of the system of FIG. 4.

FIG. 5 illustrates exemplary software architecture 500, according to some implementations of the current subject matter. A data storage application 404, which may be implemented in one or more of hardware and software, may include one or more of a database application, a network-attached storage system, or the like. According to at least some implementations of the current subject matter, such a data storage application 404 may include or otherwise interface with a persistence layer 412 or other type of memory buffer, for example via a persistence interface 502. A page buffer 504 within the persistence layer 412 may store one or more logical pages 506, and optionally may include shadow pages, active pages, and the like. The logical pages 506 retained in the persistence layer 412 may be written to a storage (e.g. a longer term storage, etc.) 414 via an input/output component 416, which may be a software module, a sub-system implemented in one or more of software and hardware, or the like. The storage 414 may include one or more data volumes 510 where stored pages 512 are allocated at physical memory blocks.

In some implementations, the data storage application 404 may include or be otherwise in communication with a page manager 514 and/or a savepoint manager 516. The page manager 514 may communicate with a page management module 520 at the persistence layer 412 that may include a free block manager 522 that monitors page status information 524, for example the status of physical pages within the storage 414 and logical pages in the persistence layer 412 (and optionally in the page buffer 504). The savepoint manager 516 may communicate with a savepoint coordinator 526 at the persistence layer 412 to handle savepoints, which are used to create a consistent persistent state of the database for restart after a possible crash.

In some implementations of a data storage application 404, the page management module of the persistence layer 412 may implement a shadow paging. The free block manager 522 within the page management module 520 may maintain the status of physical pages. The page buffer 504 may include a fixed page status buffer that operates as discussed herein. A converter component 540, which may be part of or in communication with the page management module 520, may be responsible for mapping between logical and physical pages written to the storage 414. The converter 540 may maintain the current mapping of logical pages to the corresponding physical pages in a converter table 542. The converter 540 may maintain a current mapping of logical pages 506 to the corresponding physical pages in one or more converter tables 542. When a logical page 506 is read from storage 414, the storage page to be loaded may be looked up from the one or more converter tables 542 using the converter 540. When a logical page is written to storage 414 the first time after a savepoint, a new free physical page is assigned to the logical page. The free block manager 522 marks the new physical page as "used" and the new mapping is stored in the one or more converter tables 542.

The persistence layer 412 may ensure that changes made in the data storage application 404 are durable and that the data storage application 404 may be restored to a most recent committed state after a restart. Writing data to the storage 414 need not be synchronized with the end of the writing transaction. As such, uncommitted changes may be written to disk and committed changes may not yet be written to disk when a writing transaction is finished. After a system crash, changes made by transactions that were not finished may be rolled back. Changes occurring by already committed transactions should not be lost in this process. A logger component 544 may also be included to store the changes made to the data of the data storage application in a linear log. The logger component 544 may be used during recovery to replay operations since a last savepoint to ensure that all operations are applied to the data and that transactions with a logged "commit" record are committed before rolling back still-open transactions at the end of a recovery process.

With some data storage applications, writing data to a disk is not necessarily synchronized with the end of the writing transaction. Situations may occur in which uncommitted changes are written to disk and while, at the same time, committed changes are not yet written to disk when the writing transaction is finished. After a system crash, changes made by transactions that were not finished must be rolled back and changes by committed transaction must not be lost.

To ensure that committed changes are not lost, redo log information may be written by the logger component 544 whenever a change is made. This information may be written to disk at latest when the transaction ends. The log entries may be persisted in separate log volumes while normal data is written to data volumes. With a redo log, committed changes may be restored even if the corresponding data pages were not written to disk. For undoing uncommitted changes, the persistence layer 412 may use a combination of undo log entries (from one or more logs) and shadow paging.

The persistence interface 502 may handle read and write requests of stores (e.g., in-memory stores, etc.). The persistence interface 502 may also provide write methods for writing data both with logging and without logging. If the logged write operations are used, the persistence interface 502 invokes the logger 544. In addition, the logger 544 provides an interface that allows stores (e.g., in-memory stores, etc.) to directly add log entries into a log queue. The logger interface also provides methods to request that log entries in the in-memory log queue are flushed to disk.

Log entries contain a log sequence number, the type of the log entry and the identifier of the transaction. Depending on the operation type additional information is logged by the logger 544. For an entry of type "update", for example, this would be the identification of the affected record and the after image of the modified data.

When the data application 404 is restarted, the log entries need to be processed. To speed up this process the redo log is not always processed from the beginning. Instead, as stated above, savepoints may be periodically performed that write all changes to disk that were made (e.g., in memory, etc.) since the last savepoint. When starting up the system, only the logs created after the last savepoint need to be processed. After the next backup operation the old log entries before the savepoint position may be removed.

When the logger 544 is invoked for writing log entries, it does not immediately write to disk. Instead it may put the log entries into a log queue in memory. The entries in the log queue may be written to disk at the latest when the corresponding transaction is finished (committed or aborted). To guarantee that the committed changes are not lost, the commit operation is not successfully finished before the corresponding log entries are flushed to disk. Writing log queue entries to disk may also be triggered by other events, for example when log queue pages are full or when a savepoint is performed.

With the current subject matter, the logger 544 may write a database log (or simply referred to herein as a "log") sequentially into a memory buffer in natural order (e.g., sequential order, etc.). If several physical hard disks/storage devices are used to store log data, several log partitions may be defined. Thereafter, the logger 544 (which as stated above acts to generate and organize log data) may load-balance writing to log buffers over all available log partitions. In some cases, the load-balancing is according to a round-robin distributions scheme in which various writing operations are directed to log buffers in a sequential and continuous manner. With this arrangement, log buffers written to a single log segment of a particular partition of a multi-partition log are not consecutive. However, the log buffers may be reordered from log segments of all partitions during recovery to the proper order.

As stated above, the data storage application 404 may use shadow paging so that the savepoint manager 516 may write a transactionally-consistent savepoint. With such an arrangement, a data backup comprises a copy of all data pages contained in a particular savepoint, which was done as the first step of the data backup process. The current subject matter may be also applied to other types of data page storage.

Figure 6:
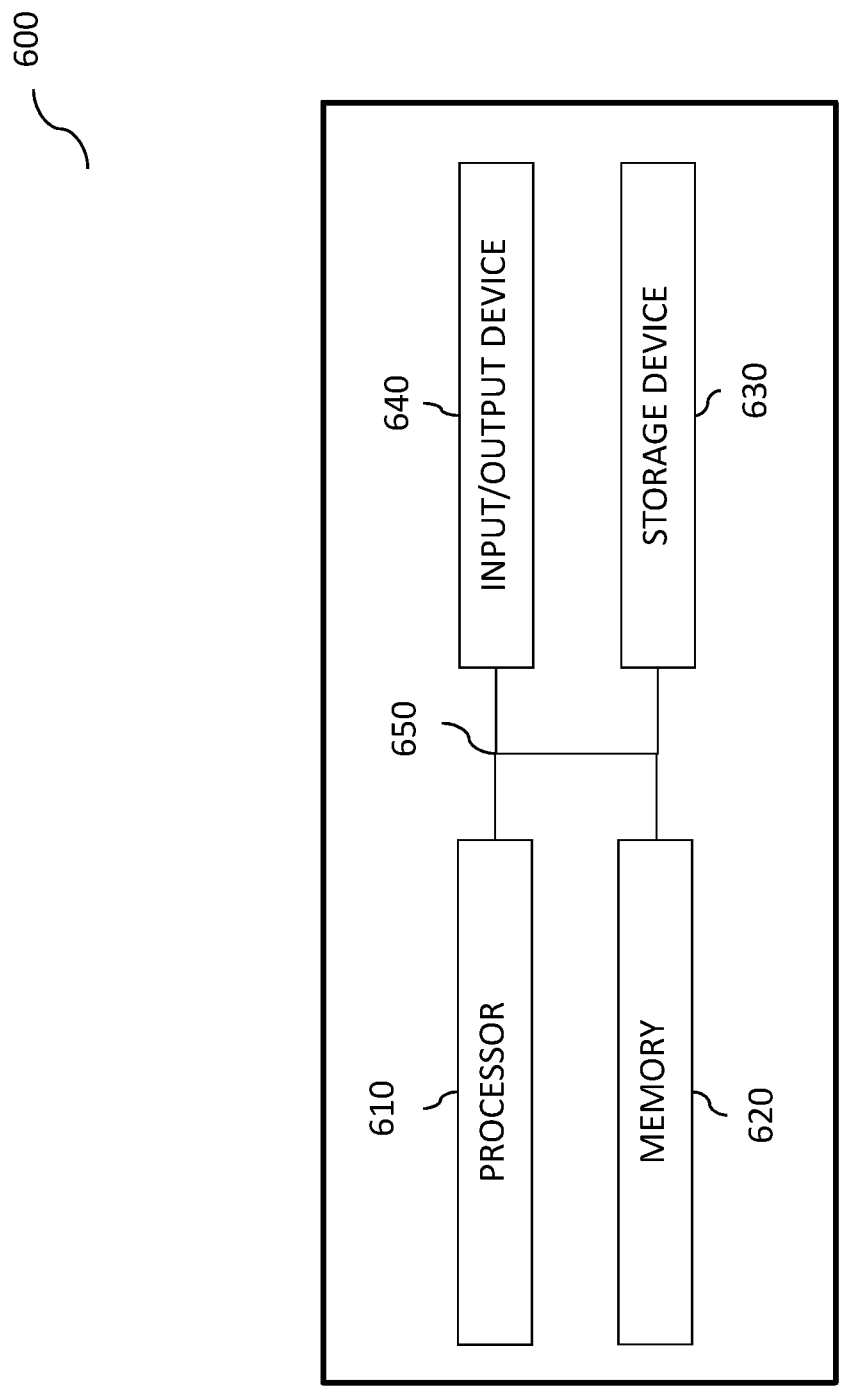
FIG. 6 is an exemplary system, according to some implementations of the current subject matter.

In some implementations, the current subject matter can be configured to be implemented in a system 600, as shown in FIG. 6. The system 600 can include a processor 610, a memory 620, a storage device 630, and an input/output device 640. Each of the components 610, 620, 630 and 640 can be interconnected using a system bus 650. The processor 610 can be configured to process instructions for execution within the system 600. In some implementations, the processor 610 can be a single-threaded processor. In alternate implementations, the processor 610 can be a multi-threaded processor. The processor 610 can be further configured to process instructions stored in the memory 620 or on the storage device 630, including receiving or sending information through the input/output device 640. The memory 620 can store information within the system 600. In some implementations, the memory 620 can be a computer-readable medium. In alternate implementations, the memory 620 can be a volatile memory unit. In yet some implementations, the memory 620 can be a non-volatile memory unit. The storage device 630 can be capable of providing mass storage for the system 600. In some implementations, the storage device 630 can be a computer-readable medium. In alternate implementations, the storage device 630 can be a floppy disk device, a hard disk device, an optical disk device, a tape device, non-volatile solid state memory, or any other type of storage device. The input/output device 640 can be configured to provide input/output operations for the system 600. In some implementations, the input/output device 640 can include a keyboard and/or pointing device. In alternate implementations, the input/output device 640 can include a display unit for displaying graphical user interfaces.

Figure 7:
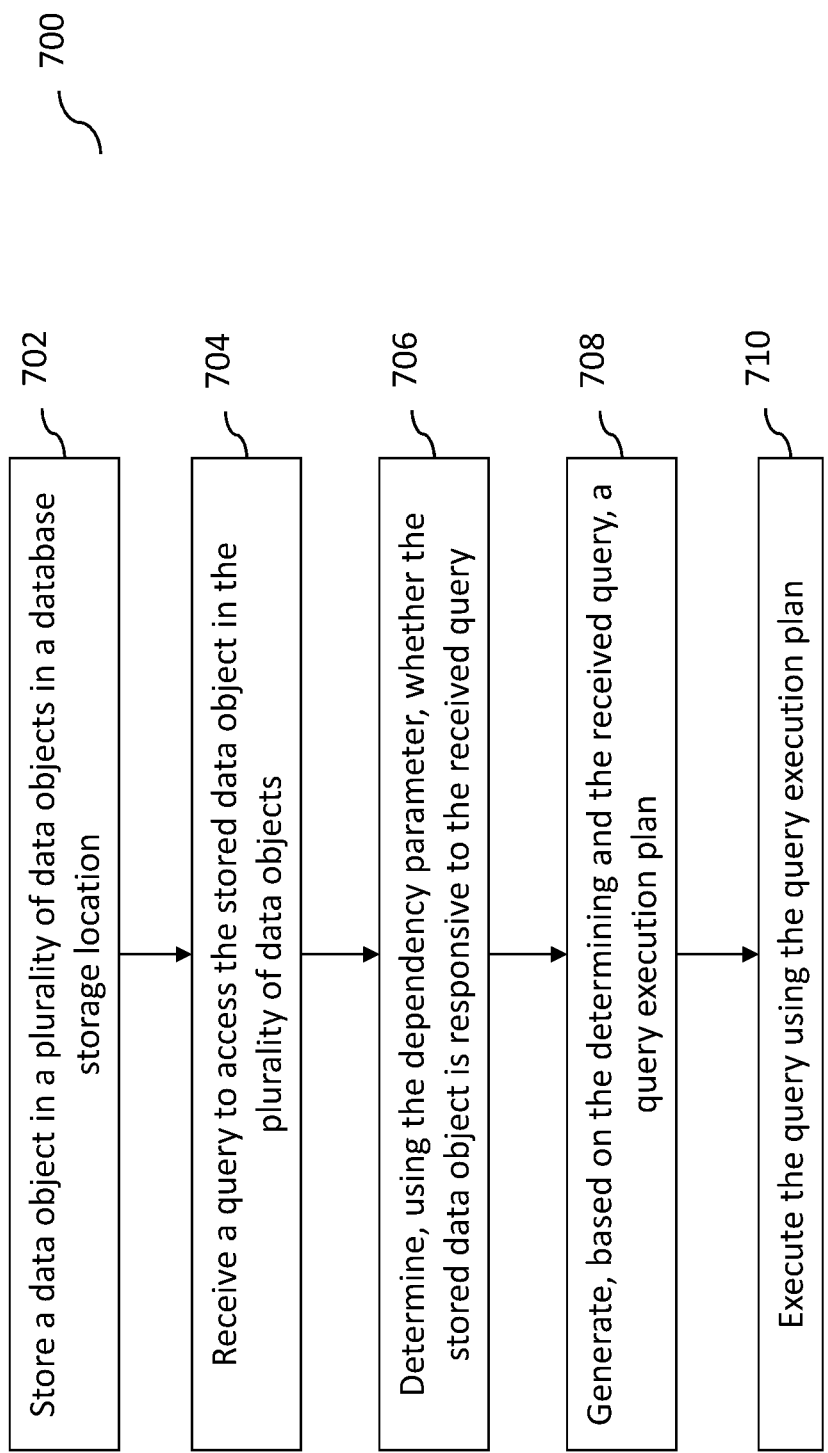
FIG. 7 is an exemplary method, according to some implementations of the current subject matter.

FIG. 7 illustrates an exemplary method 700 for generating a computational dependency directory and executing a query on a database using generated computational dependency directory, according to some implementations of the current subject matter. The method 700 may be executed using one or more components of the FIG. 2 and in particular using the engine 204 and/or database 206. For example, the method 700 may involve use of the computational dependency directory 208 that may store various dependency parameters (e.g., session, user, views, hierarchy, analytical privilege, etc.) that may be indicative of specific dependencies of data objects that may be identified in the queries received by the engine 204.

At 702, a data object in a plurality of data objects may be stored in a database storage location (e.g., database 206). The data object may include a dependency parameter that may be indicative of the stored data object being dependent on at least another data object (e.g., session, user, etc.) in the plurality of data objects.

At 704, a query to access the stored data object in the plurality of data objects may be received. The query may be transmitted by one or more users 202 shown in FIG. 2 to the engine 204. The engine 204 may determine whether or not one or more cached data objects, resulting from prior executions of other queries may be used.

At 706, using the dependency parameter, the engine 204 may determine whether the stored data object is responsive to the received query. For example, if the stored data object has been generated for a particular user and/or session, it may be associated with a specific dependency that may be indicative of certain limitations on the object's usability for responses to other queries (e.g., it might or might not be used).

At 708, the engine 204 may generate, based on the above determination and the received query, a query execution plan. The engine 204 may involve central cache manager component 312 and query plan optimizer component 314, as shown in FIG. 3, to generate an appropriate query execution plan. Once the plan has been generated, the received query may be executed, at 710.

In some implementations, the current subject matter can include one or more of the following optional features. The dependency parameter may be indicative of at least one of the following: a physical dependency of the stored data object on at least another data object in the plurality of data objects, a logical dependency of the stored data object on at least another data object in the plurality of data objects, and any combination thereof.

In some implementations, the stored data object may be a cached data object stored in the database storage location and being generated in response to executing at least another received query.

In some implementations, the dependency parameter may be determined based on a predetermined type of the stored data object. The predetermined type of the stored data object may be associated with at least one of the following: a session dependency, a user dependency, a hierarchy dependency, an analytic privilege dependency, a built-in function dependency, a general view dependency, an order dependency, and any combination thereof. Further, generation of the query execution plan may include preventing access to the stored data object during execution of the received query upon determining that the dependency parameter is associated with the predetermined type of the stored data object.

In some implementations, generation of the query execution plan may include allowing access to the stored data object.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

The systems and methods disclosed herein can be implemented as a computer program product, i.e., a computer program tangibly embodied in an information carrier, e.g., in a machine readable storage device or in a propagated signal, for execution by, or to control the operation of, data processing apparatus, e.g., a programmable processor, a computer, or multiple computers. A computer program can be written in any form of programming language, including compiled or interpreted languages, and it can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

As used herein, the term "user" can refer to any entity including a person or a computer.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:
1. A computer-implemented method, comprising:
storing a data object in a plurality of data objects in a database storage location as a stored data object comprising a dependency parameter indicative of the stored data object being dependent on at least another data object in the plurality of data objects;
receiving a query to access the stored data object in the plurality of data objects;
determining, using the dependency parameter, that the stored data object is responsive to the query satisfying data reading operation conditions of the database storage location;
generating, using a query optimizer, a query execution plan comprising a query algebra, the query optimizer using cached data and a cost function to minimize an execution cost of the query execution plan to generate an optimized query algebra for the data reading operation conditions, the cached data comprising intermediate results of executed queries;

selecting, using the query optimizer, a query execution engine to execute the query execution plan; and executing, using the query execution engine, the query by compiling the optimized query algebra into operations comprising dynamically injecting dependencies in the query execution plan.

2. The computer-implemented method of claim 1, wherein the dependency parameter being indicative of at least one of: a physical dependency of the stored data object on at least another data object in the plurality of data objects, a logical dependency of the stored data object on at least another data object in the plurality of data objects, and any combination thereof.

3. The computer-implemented method of claim 1, wherein the stored data object is a cached data object stored in the database storage location and being generated in response to executing at least another query.

4. The computer-implemented method of claim 1, wherein the dependency parameter is determined based on a predetermined type of the stored data object.

5. The computer-implemented method of claim 4, wherein the predetermined type of the stored data object is associated with at least one of: a session dependency, a user dependency, a hierarchy dependency, an analytic privilege dependency, a built-in function dependency, a general view dependency, an order dependency, and any combination thereof.

6. The computer-implemented method of claim 5, wherein generating the query execution plan comprises:
determining that the dependency parameter is associated with the predetermined type of the stored data object; and
preventing access to the stored data object during execution of the query.

7. The computer-implemented method of claim 1, wherein generating the query execution plan comprises allowing access to the stored data object.

8. A system comprising:
at least one programmable processor; and
a non-transitory machine-readable medium storing instructions that, when executed by the at least one programmable processor, cause the at least one programmable processor to perform operations comprising:
storing a data object in a plurality of data objects in a database storage location as a stored data object comprising a dependency parameter indicative of the stored data object being dependent on at least another data object in the plurality of data objects;
receiving a query to access the stored data object in the plurality of data objects;
determining, using the dependency parameter, that the stored data object is responsive to the query satisfying data reading operation conditions of the database storage location;
generating, using a query optimizer, a query execution plan comprising a query algebra, the query optimizer using cached data and a cost function to minimize an execution cost of the query execution plan to generate an optimized query algebra for the data reading operation conditions, the cached data comprising intermediate results of executed queries;
selecting, using the query optimizer, a query execution engine to execute the query execution plan; and
executing, using the query execution engine, the query by compiling the optimized query algebra into operations comprising dynamically injecting dependencies in the query execution plan.

9. The system of claim 8, wherein the dependency parameter being indicative of at least one of: a physical dependency of the stored data object on at least another data object in the plurality of data objects, a logical dependency of the stored data object on at least another data object in the plurality of data objects, and any combination thereof.

10. The system of claim 8, wherein the stored data object is a cached data object stored in the database storage location and being generated in response to executing at least another query.

11. The system of claim 8, wherein the dependency parameter is determined based on a predetermined type of the stored data object.

12. The system of claim 11, wherein the predetermined type of the stored data object is associated with at least one of: a session dependency, a user dependency, a hierarchy dependency, an analytic privilege dependency, a built-in function dependency, a general view dependency, an order dependency, and any combination thereof.

13. The system of claim 12, wherein generating the query execution plan comprises:
determining that the dependency parameter is associated with the predetermined type of the stored data object; and
preventing access to the stored data object during execution of the query.

14. The system of claim 8, wherein generating the query execution plan comprises allowing access to the stored data object.

15. A computer program product comprising a non-transitory machine-readable medium storing instructions that, when executed by at least one programmable processor, cause the at least one programmable processor to perform operations comprising:
storing a data object in a plurality of data objects in a database storage location as a stored data object comprising a dependency parameter indicative of the stored data object being dependent on at least another data object in the plurality of data objects;
receiving a query to access the stored data object in the plurality of data objects;
determining, using the dependency parameter, that the stored data object is responsive to the query satisfying data reading operation conditions of the database storage location;
generating, using a query optimizer, a query execution plan comprising a query algebra, the query optimizer using cached data and a cost function to minimize an execution cost of the query execution plan to generate an optimized query algebra for the data reading operation conditions, the cached data comprising intermediate results of executed queries; and
selecting, using the query optimizer, a query execution engine to execute the query execution plan;
executing, using the query execution engine, the query by compiling the optimized query algebra into operations comprising dynamically injecting dependencies in the query execution plan.

16. The computer program product of claim 15, wherein the dependency parameter being indicative of at least one of: a physical dependency of the stored data object on at least another data object in the plurality of data objects, a logical dependency of the stored data object on at least another data object in the plurality of data objects, and any combination thereof.

17. The computer program product of claim 15, wherein the stored data object is a cached data object stored in the database storage location and being generated in response to executing at least another query.

18. The computer program product of claim 15, wherein the dependency parameter is determined based on a predetermined type of the stored data object.

19. The computer program product of claim 18, wherein the predetermined type of the stored data object is associated with at least one of: a session dependency, a user dependency, a hierarchy dependency, an analytic privilege dependency, a built-in function dependency, a general view dependency, an order dependency, and any combination thereof, and wherein generating the query execution plan comprises preventing access to the stored data object during execution of the query upon determining that the dependency parameter is associated with the predetermined type of the stored data object.

20. The computer program product of claim 15, wherein generating the query execution plan comprises allowing access to the stored data object.

\* \* \* \* \*